United States Patent [19]

Goetzinger

[11] Patent Number: 4,524,949
[45] Date of Patent: Jun. 25, 1985

[54] HIGH PRESSURE BUTTERFLY VALVE WITH FLOATING DISK VALVE MEMBER

[76] Inventor: John R. Goetzinger, 2956 W. 17th St., Erie, Pa. 16506

[21] Appl. No.: 462,208

[22] Filed: Jan. 31, 1983

[51] Int. Cl.³ .............................................. F16K 25/00
[52] U.S. Cl. ...................................... 251/163; 251/308
[58] Field of Search ................. 251/160, 162, 163, 308

[56] References Cited

U.S. PATENT DOCUMENTS

| | | | |
|---|---|---|---|
| 3,477,690 | 11/1969 | Munota | 251/163 |
| 3,697,042 | 10/1972 | Killian | 251/163 |
| 3,854,696 | 12/1974 | Keyes | 251/163 |

FOREIGN PATENT DOCUMENTS

| | | | |
|---|---|---|---|
| 373478 | 5/1932 | United Kingdom | 251/308 |
| 787140 | 12/1957 | United Kingdom | 251/308 |

*Primary Examiner*—Harold W. Weakley
*Attorney, Agent, or Firm*—Ralph Hammar

[57] ABSTRACT

A butterfly valve for high pressures in the range of 150 to 2500 pounds per square inch and high temperatures in which the valve member is cammed by axial movement of the stem to the closed position by a cam in a diametral slot in the valve member and the valve member is rotated between closed and opened positions by rotation of the stem and the cooperation of the same cam and slot. The valve disk may be restricted from motion in the axial direction by a retaining cover for the slot. In a preferred form, the valve stem is located between the valve disk and the retaining cover.

2 Claims, 4 Drawing Figures

HIGH PRESSURE BUTTERFLY VALVE WITH FLOATING DISK VALVE MEMBER

This invention is a butterfly valve which, in a preferred form, is made with metal to metal valve seats. The valve stem is movable axially along its axis and also rotates about its axis. The axial movement of the stem is used to cam the valve member to the closed position. Upon release of the cam action, the valve stem is rotated a quarter turn from full closed to full open.

Figure 1:
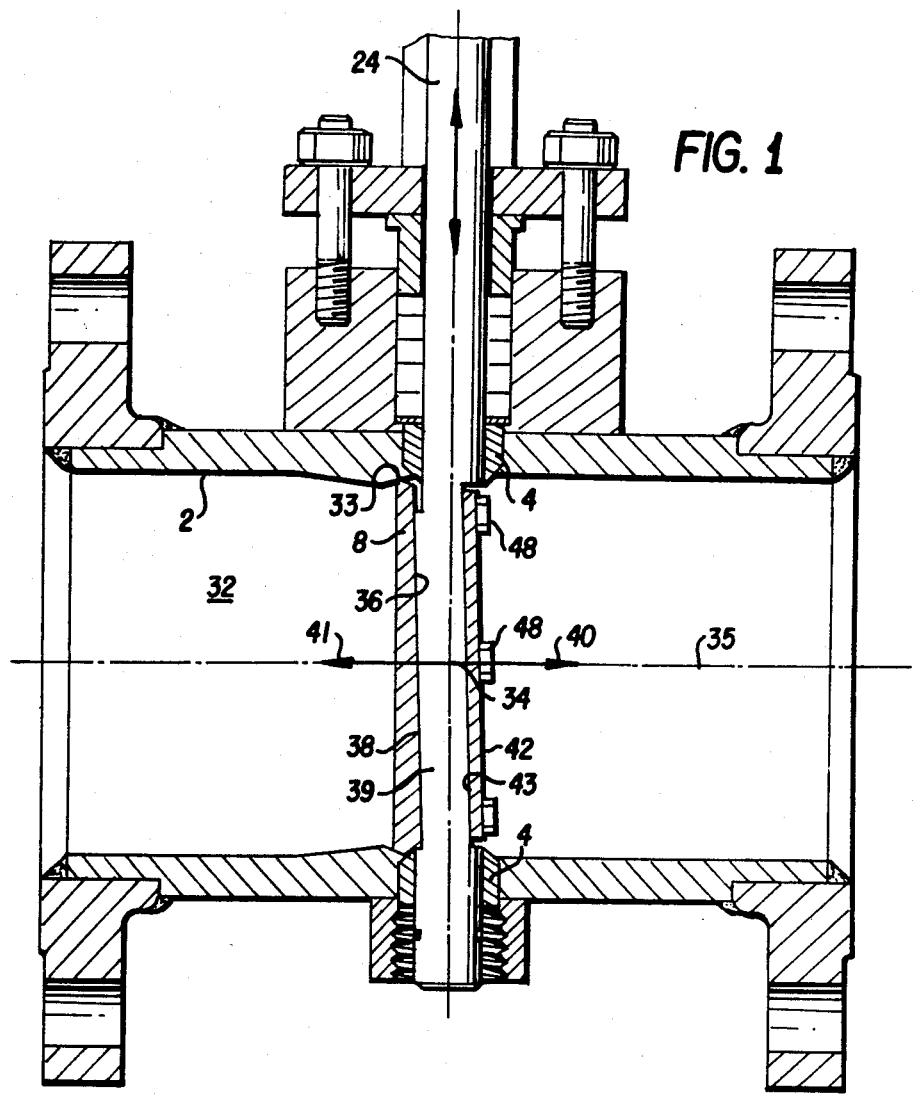
FIG. 1 is a section through an axial flow butterfly valve.
Figure 2:
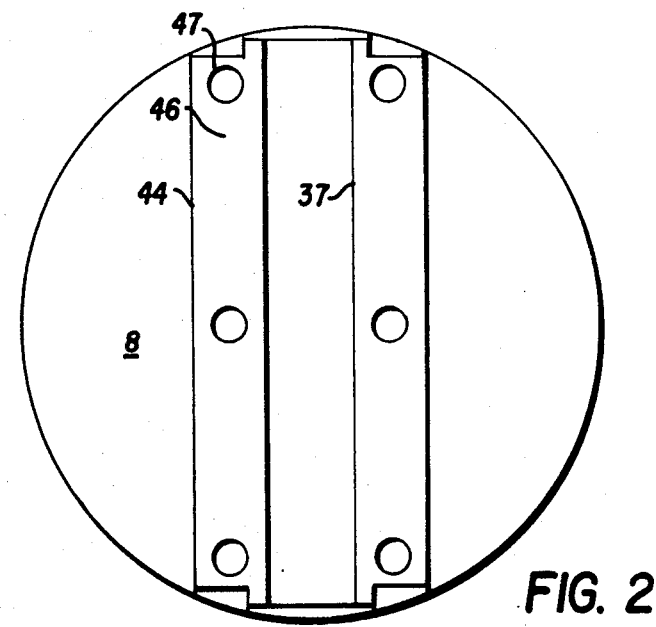
FIG. 2 is a plan view of the valve disk.
Figure 3:
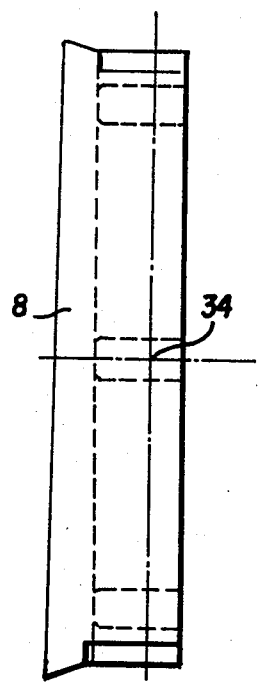
FIG. 3 is an edge view of FIG. 2 looking at right angles to the slot.
Figure 4:
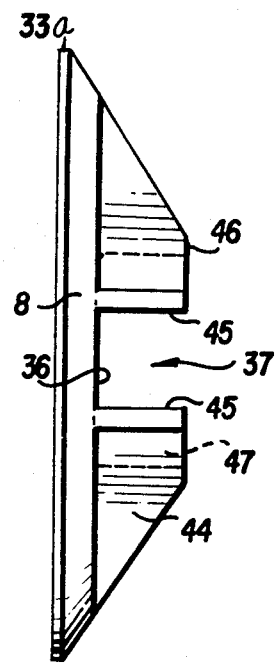
FIG. 4 is an edge view of FIG. 2 looking along the slot.

In the drawing, 2 indicates a valve body having an axial flow passageway 32 and an internal radial metal seat 33 against which a metal valve disk 8 closes to shut off the flow. The particular valve shown was designed for flow in either direction. The valve disk 8 has a radially facing seat 33a which is spherical about point 34 on the axis 35 of the passageway. The valve is operated by a valve stem 24 journaled in upper and lower bearings 4. The valve stem may slide axially along its axis as well as rotate on its axis. The valve stem is shown in the lowered position in which an inclined surface 36 at the bottom of a slot 37 in the back face of the valve disk cooperates with a complementary inclined surface 38 on a section 39 of the valve stem which is slidably but nonrotatably received in the slot 37. From one aspect, the section 39 of the valve stem acts as a key to connect the valve disk 8 to the valve stem 24.

FIG. 1 shows the valve in the closed position where the valve stem 24 is lowered to its lowest position and the inclined surfaces 36 and 38 cooperate to wedge the radial seat 33a of the valve disk against the seat 33 of the valve. In this position the valve member is locked against the valve seat. By pushing up on the upper end of the valve stem, the locking pressure developed between the inclined surfaces 36 and 38 is released. When the fluid flow is in the direction of arrow 40, the fluid pressure on the upstream side of the valve pushes the valve member clear of the seat 33a so that it is no longer locked in place, but may be freely turned by the valve stem. When the fluid flow is in the direction of arrow 41, the fluid pressure holds the retainer 42 against the opposite side 43 of the stem which moves the valve member 8 clear of the seat 33. The same movement of the valve member away from the seat 33 occurs when there is no fluid pressure. Under all conditions, the valve member 8 is first moved axially away from the seat 33 before there is any rotation of the valve member toward the open position. This avoids scuffing of the valve seats and increases the life of the valve. A quarter turn is all that is needed to move the valve member 8 from full closed position to full open position. In full open position, the plane of the valve disk 8 is aligned with the direction of flow and the resistance to flow offered by the valve member is at a minimum. The valve stem may be manually raised and lowered to lock and unlock the valve and manually turned to open and close the valve.

The valve may be returned to the closed position by first rotating the valve stem a quarter turn while the valve stem is in its raised position, then lowering the valve stem a short distance to lock the valve disk in place after the initial closing.

The floating connection provided by the cammed slot between the valve member and valve stem is the entire connection between the two parts. The valve stem is located between the valve disk and the retaining cover.

The back of the valve member 8 is reenforced by spaced ribs 44. The adjacent sides 45 of the ribs are parallel to each other and form the sides of the slot 37. The upper edges 46 of the ribs are parallel to the inclined surface 36 at the bottom of the slot 37 and are provided with tapped holes 47 for hold down screws 48 for the cover plate or retainer 42.

I claim:

1. A valve comprising
   a unitary body having an axial flow passageway therethrough defined in part by a radial metal valve seat,
   a unitary metal valve disk member having a forward face with a metal radially sealing surface which sealably engages said metal radial seat when the disk is in closed position, the valve disk member further having a rearward face opposite said forward face, said sealing surface being spherical about a point on the axis of flow through said passageway to the rear of said forward face,
   a diametral slot in the rearward face of the valve disk member, said slot being of rectangular cross section with its bottom wall inclined to the axis of the valve stem at a wedging angle,
   a unitary valve stem journaled in said body for rotation about and axial displacement along its axis, the stem axis extending transverse to the axis of flow through said passageway,
   a cam integral with the stem cooperating with a surface at the bottom of said slot to wedge the disk toward said seat upon said axial displacement of the stem, said cam being a section of the valve stem of rectangular cross section complementary to the slot and wedging the valve closed upon axial displacement of the stem,
   and a retainer fixed to the valve disk member extending over the stem remote from said bottom surface and holding the stem in said slot.

2. The valve of claim 1 in which the connection between the cam and slot is free sliding along and in and out of the slot.

* * * * *